(12) United States Patent
Molloy

(10) Patent No.: US 12,162,191 B2
(45) Date of Patent: Dec. 10, 2024

(54) METHOD OF RECYCLING TIRES

(71) Applicant: Mark Molloy, Mangawhai Heads (NZ)

(72) Inventor: Mark Molloy, Mangawhai Heads (NZ)

(*) Notice: Subject to any disclaimer, the term of this patent is extended or adjusted under 35 U.S.C. 154(b) by 662 days.

(21) Appl. No.: 17/312,661

(22) PCT Filed: Dec. 12, 2018

(86) PCT No.: PCT/NZ2018/050176
§ 371 (c)(1),
(2) Date: Jun. 10, 2021

(87) PCT Pub. No.: WO2020/122737
PCT Pub. Date: Jun. 18, 2020

(65) Prior Publication Data
US 2022/0048224 A1    Feb. 17, 2022

(51) Int. Cl.
| | | |
|---|---|---|
| *B29C 39/00* | (2006.01) | |
| *B09B 3/21* | (2022.01) | |
| *B29B 17/00* | (2006.01) | |
| *B29C 39/10* | (2006.01) | |
| *B29K 105/26* | (2006.01) | |
| *B29K 305/12* | (2006.01) | |
| *B29L 31/10* | (2006.01) | |

(52) U.S. Cl.
CPC .......... *B29C 39/10* (2013.01); *B09B 3/21* (2022.01); *B29B 17/0026* (2013.01); *B29K 2105/26* (2013.01); *B29K 2305/12* (2013.01); *B29L 2031/10* (2013.01)

(58) Field of Classification Search
CPC ........... B29C 39/00; B29C 39/10; B09B 1/00; B09B 3/21; B09B 3/24; B29B 17/00; B29B 17/0026; B29K 2305/00; B29K 2305/12; B29L 2031/10; B29L 2031/00
See application file for complete search history.

(56) References Cited

U.S. PATENT DOCUMENTS

| | | | | |
|---|---|---|---|---|
| 5,172,528 A | * | 12/1992 | Clarke | .................... E04B 1/167 52/DIG. 9 |
| 5,681,194 A | * | 10/1997 | Baker | ................... C04B 18/022 428/903.3 |
| 6,098,531 A | * | 8/2000 | Reinert, Sr. | ............... B09B 1/00 52/DIG. 9 |
| 6,401,420 B1 | | 6/2002 | Salls | |
| 10,703,909 B1 | * | 7/2020 | Nystrom | ................ C08G 18/48 |
| 11,549,016 B2 | * | 1/2023 | Kotefski | ................ C10C 3/007 |
| 2011/0254192 A1 | | 10/2011 | Leon | |
| 2017/0175349 A1 | | 6/2017 | Davis et al. | |

(Continued)

*Primary Examiner* — Chi Q Nguyen
(74) *Attorney, Agent, or Firm* — Weiss & Moy, PC; Jeffrey D. Moy

(57) ABSTRACT

A method of recycling tires places tires and/or pieces of tires within a casing or mold. A binder (e.g. adhesives and/or pining with screws, nails, nuts and bolts, pins, wire and steel or nylon bands etc) is applied to the tires and/or pieces of tires so that the tires are bound together. A reinforcing means is applied to the tires and/or pieces of tires (e.g. fitting the reinforcing means around, in between and/or through the tires etc). An encapsulating means is melted and poured over the top of the tires and reinforcing means to encapsulate them inside the casing or mold and the encapsulating means. The encapsulating means is allowed to set such that a recycled product is formed.

15 Claims, 4 Drawing Sheets

(56) References Cited

U.S. PATENT DOCUMENTS

| | | | |
|---|---|---|---|
| 2018/0257984 A1* | 9/2018 | Spreen | B32B 21/12 |
| 2020/0224032 A1* | 7/2020 | Kotefski | C08L 91/00 |
| 2020/0362172 A1* | 11/2020 | Nystrom | B29C 43/003 |
| 2021/0179852 A1* | 6/2021 | Nystrom | C08L 75/04 |
| 2022/0243037 A1* | 8/2022 | Ostvik | C08K 11/005 |
| 2023/0075737 A1* | 3/2023 | Kotefski | C04B 26/26 |

\* cited by examiner

METHOD OF RECYCLING TIRES

FIELD OF INVENTION

The invention generally relates to a method of recycling. More particularly, but not exclusively the invention relates to a method of recycling tires and other waste materials.

BACKGROUND

It is estimated that there are over one billion end of life tires generated annually. Tires which are sent to landfills or which are dumped illegally are problematic as they take up a lot of space, are non-degradable and also pose a significant health and safety risk because if they were to catch fire they can burn for months creating pollution.

It is an object of a preferred form of the present invention to go at least some way towards addressing the above problem by recycling tires into new products. While this is an object of a preferred embodiment, it should not be seen as a limitation on the scope of the invention as claimed. The object of the invention per se is simply to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein; this reference does not constitute an admission that any of these documents form part of the common general knowledge in the art, in New Zealand or in any other country.

The term "comprising" and derivatives thereof, e.g. "comprises", if and when used herein in relation to a combination of features should not be taken as excluding the possibility that the combination may have further unspecified features. For example, a statement that an arrangement "comprises" certain parts does not mean that it cannot also, optionally, have additional parts.

SUMMARY OF THE INVENTION

According to one aspect of the invention there is provided a method of recycling tires comprising the steps of:
  placing tires and/or pieces of tires within a casing or mold;
  applying a binder (e.g. adhesives and/or pining with screws, nails, nuts and bolts, pins, wire and steel or nylon bands etc) to the tires and/or pieces of tires so that the tires are bound together;
  applying a reinforcing means to the tires and/or pieces of tires (e.g. fitting the reinforcing means around, in between and/or through the tires etc); and
  melting or pouring an encapsulating means over the top of the tires and reinforcing means to encapsulate them inside the casing or mold and the encapsulating means; and
  causing or allowing the encapsulating means to set such that a recycled product is formed.

Preferably the encapsulating means is heated to a temperature which is sufficiently high enough to soften and melt the encapsulating means such that it becomes moldable so that it can be spread to cover and encapsulate the tires and the reinforcing means.

Preferably the encapsulating means is plastic.

Preferably the encapsulating means is a room temperature liquid adhesive (sometimes called an emulsion) or melted waste plastic heated to a temperature which is sufficiently high enough to soften and melt the encapsulating means such that it becomes fluid like so that it can be spread to cover and encapsulate the tires and the reinforcing means.

Preferably the binder is an adhesive or adhesives.

Preferably the binder is metal pins, screws, nails, nuts and bolts, wire and steel and/or nylon bands in with or without an adhesive or adhesives.

Preferably waste materials are placed within the casing or mold before an adhesive is added and when the adhesive is applied it binds the tires and waste materials together (and assists with binding the tires together).

Preferably the waste material comprises:
  plastic;
  electronic components and circuit boards;
  batteries;
  pieces of metal and machine components;
  glass and light bulbs;
  asbestos, fibrous cement and/or discarded concrete; and/or
  fabrics.

Preferably the tires or pieces of tires are arranged in a generally concentric arrangement.

Preferably the reinforcing means is metal pins, metal rods and/or metal wire.

Preferably the reinforcing means are arranged in a grid like pattern and are configured such that they are on top and/or surround the tires and/or pieces of tires.

Preferably the casing comprises a base and four side walls connected to the base.

Preferably the casing has a leach pool lining.

Preferably the casing is leach proof.

Preferably the casing blocks or resists UV.

Preferably the casing is fire resistant.

In another aspect of the invention there is provided a recycled product is formed by the previously described method.

According to a further aspect of the invention there is provided a building component having:
  a casing;
  tires and/or pieces of tires housed within the casing wherein the tires are bound together by a suitable binder;
  a reinforcing means; and
  an encapsulating means which encapsulates the tires and/or pieces of tires and the reinforcing means within the casing.

Preferably the component also has waste materials housed within the casing which are bound together and bound to the tires and/or pieces of tires.

Preferably the waste material comprises:
  plastic;
  electronic components and circuit boards;
  batteries;
  pieces of metal and machine components;
  glass and light bulbs;
  asbestos, fibrous cement and/or discarded concrete; and/or
  fabrics.

Preferably the encapsulating means is plastic.

Preferably the binder and/or encapsulating means is an adhesive or adhesives.

Preferably the binder is metal pins, screws, nails, nuts and bolts, wire and steel and/or nylon bands in combination with an adhesive or adhesives.

Preferably the tires or pieces of tires are arranged in a generally concentric arrangement.

Preferably the reinforcing means is metal pins, metal rods and/or metal wire.

Preferably the reinforcing means are arranged in a grid like pattern and are configured such that they are on top of and/or surround the tires and/or pieces of tires.

Preferably the casing comprises a base and four side walls connected to the base.

Preferably the casing has a leach poof lining.

Preferably the casing is leach proof.

Preferably the casing blocks or resists UV.

Preferably the casing is fire resistant.

These and other features, objects and advantages of the present invention will be readily apparent to persons of ordinary skill in the art upon reading the entirety of this disclosure, which includes the accompanying drawings and claims.

BRIEF DESCRIPTION OF THE DRAWINGS

Some preferred embodiments of the invention will now be described by way of example and with reference to the accompanying drawings, of which.

DETAILED DESCRIPTION

The present invention generally relates to a recycling tires (and other waste materials) which are no longer suitable for use on vehicles due to wear or damage (e.g. end of life tires) into new products.

Figure 1:
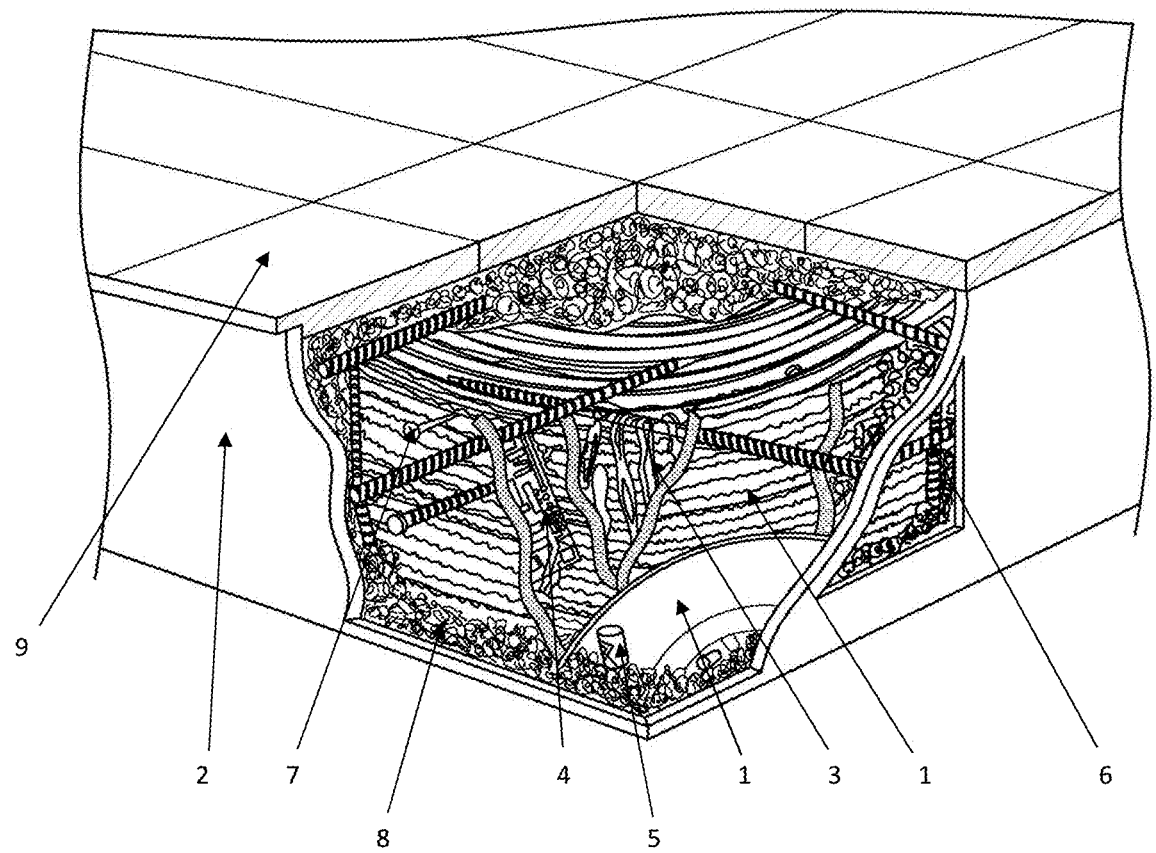
FIG. 1 is a perspective sectional view of a building component which has been made from recycled tires and other materials.
Figure 4:
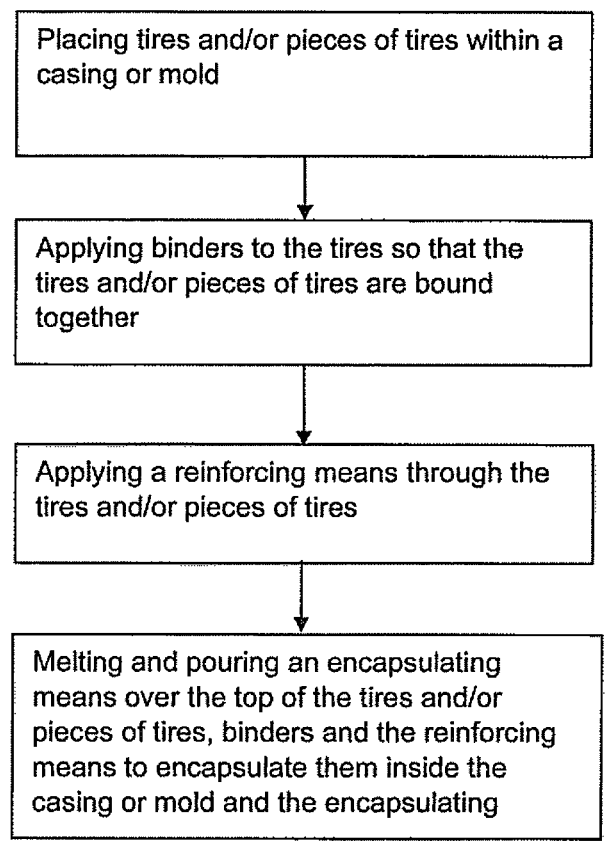
FIG. 4 is an exemplary flowchart showing a method of recycling tires in accordance with one aspect of the present disclosure.

With reference to FIG. 1 and FIG. 4, the first step in the method involves placing tires (or pieces or tires) 1 into a casing 2 or mold (not shown) which preferably has a leach proof liner or liners or forms a leach proof liner within a casing 2 (or mold) such as ultra high density polyethylene etc. The casing 2 or mold is preferably square and has four side walls and a base made from steel or plastics such as high molecular weight polyethylene, polyurethane or the like. However, those skilled in the art will appreciate that the casing 2 can be made from other materials such as concrete, wood or any other suitable material and can come in different shapes and sizes. In some embodiments the casing 2 may be fire and/or UV proof.

In the preferred method smaller tires 1 are inserted inside larger tires 1 by cutting out one or both side walls of the tires 1. Mixed plastics 3 and tire off cuts can be used to fill in the gaps (and create tension) in between the tires 1. The tires 1 and tire pieces are preferably arranged into concentric layers however those skilled in the art will appreciate that they can be arranged differently.

Mixed plastics 3 and other waste materials such as electronic components and circuit boards 4, batteries 5, pieces of metal and machine components (not shown), glass and light bulbs (not shown), asbestos, fibrous cement and/or discarded concrete (not shown), and/or fabrics (not shown) may also be added and then these are bound or encapsulated with a suitable adhesive (either before or after reinforcing means are added). These waste items/materials can fill the gaps and create tension between the tires 1. Steel rods 6, screws 7, nails (not shown), nuts and bolts (not shown) and/or metal pins (not shown), wire and steel and/or nylon bands (not shown) and the like are used for reinforcement. These reinforcing means may be fitted around, in between and/or through the tires 1.

Once all of the tires 1 and any waste materials have been added the next stage involves binding the materials and tires 1 together. The binder is most preferably an adhesive and/or encapsulating means such as melted plastics 8 and the like. However, the binder can also be metal pins, screws, nails, nuts and bolts, wire mesh and/or steel or nylon bands and can also be any of these items in combination with or without an adhesive.

In some embodiments a funnel is used to pour in an adhesive however those skilled in the art will appreciate that other means of adding adhesive can be used as could different means of activating an adhesive (if activation is required). Those skilled in the art will also appreciate that adhesives and/or encapsulating means can be added in different amounts at different stages and at different times when adding in waste materials and tires and/or pieces of tires.

Figure 2:
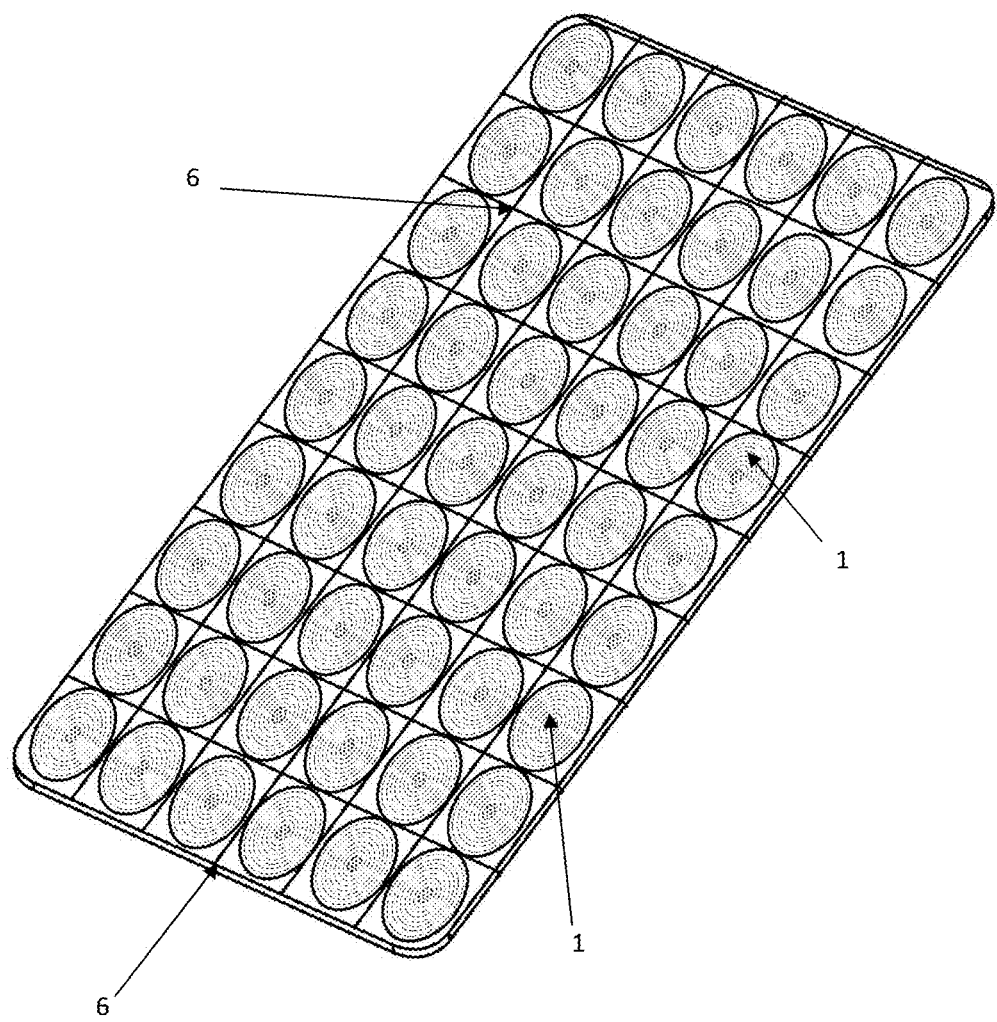
FIG. 2 is a top perspective view of a building component which has been made from recycled tires and other materials.

The waste materials 4, 5, and tires 1 are bound together by sufficient amounts of an adhesive or adhesives and/or an encapsulating means. The steel reinforcing rods 6 are preferably arranged in a grid like pattern like shown in FIGS. 2 and 3 and these are attached to metal pins with wires or a wire mesh or any other suitable means and this helps to reinforce the tires 1 and other waste materials.

Figure 3:
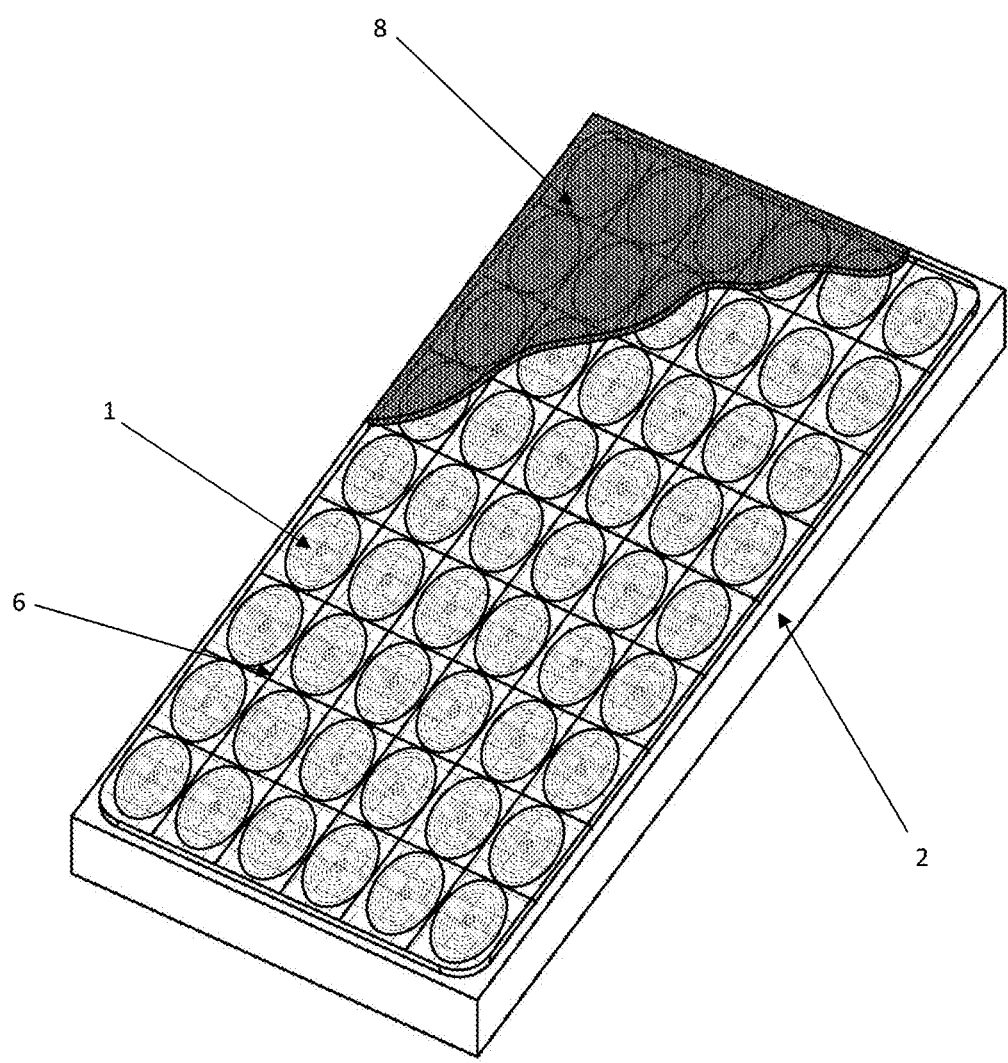
FIG. 3 is a top perspective cutaway view of a building components which has been made from recycled tires and other materials.

The final step in a preferred embodiment of the invention involves the pouring of a room temperature liquid adhesive and/or melting waste plastics 8 over the top of the tires 1 and other waste materials 4, 5 and reinforcing materials 6, 7 to encapsulate them to create a solid mass product like that shown in FIG. 3, Those skilled in the art will appreciate that there are number of different ways add the adhesive or melt plastic 8 over the tires 1. Those skilled in the art will appreciate that other suitable materials may be melted over the top of the tires. Also shown in FIG. 1 are pieces of paving stones 9 (acting as a finishing surface) which are placed on top of the solid mass product which results from the previously described method.

The resulting product from the above described method like that shown in FIG. 3 can be used for many different purposes such as building foundations, retaining walls, roads, footpaths, levees, flood control, reservoirs, ground stabilisation, land reclamation and other suitable uses.

In some embodiments fireproof or UV proof materials can be added to the product after they have been encapsulated in plastic or alternatively various aggregates of cement, sand, concrete, stones, clay, glass and/or plasters can encompass the product to make it fireproof and/or UV proof. Furthermore, the product can have other materials surrounding it such as plastic shrink wrap, metal, concrete or wood etc or other materials added as a finishing or surfacing (e.g. stones etc) to the product.

Those skilled in the art will appreciate that the reinforcing means (e.g. steel rods and pins) need not be made from steel and can be made from any suitable materials (e.g. seat belts, wire, cables, machine components, ropes, composites, concrete etc) and the arrangement of the reinforcing means can differ to provide suitable resilience, hardness and rigidity.

In alternative embodiments before the step of adding the reinforcing materials the bound tires and other waste materials can be added to other bound tires and waste materials (e.g. in a large casing). It will also be appreciated that in some embodiments very large foundations or casings in leach proof sites utilising liners similar to landfill sites can be created.

Those skilled in the art will appreciate that many different types of adhesives can be used and references throughout the specification to adhesive includes any substance capable of being applied to a surface or both surfaces of two separate surfaces which binds the two together and resists their separation such as glues, paste, resins, asphalt, cements, paints etc.

References throughout the specification to binder includes anything that binds two of more items together and includes adhesives either alone or in combination with pinning using a variety of steel screws and/or types of nails.

In addition to the previously mentioned waste products there are many different types of waste and contaminants which can be encapsulated along with the tires. In some embodiments the contaminants can be neutralised beforehand (e.g. with solvents etc) before being bound to the tires and in some embodiments waste plastic can be converted into glue or epoxies (e.g. polystyrene treated with solvents)

The method provides a number of advantages and benefits over known ways of disposing of tires and other waste materials such as plastics or recycling these materials. For example, the method can help minimise carbon emissions as well as environmental and health issues in that the tires are not burnt or melted in a pyrolysis furnace like other known ways to dispose of tires. Furthermore, as it is generally problematic and cost prohibitive to reprocess tires and many plastic waste materials in part due to energy costs and carbon emissions, this method can economically convert them into usable material. Additionally toxic waste products present in waste streams and some toxic components in plastics can be encapsulated in the encapsulating means, adhesives and melted plastics stopping them from entering the environment or causing health problems in humans or other animals. As the conglomeration encapsulates a wide variety of waste materials minimal sorting of waste products to be repurposed is required. Also, because the resulting products of the method can be used for multiple construction and earth works purposes it can help to lower the carbon foot print and costs of such projects.

It is to be understood that even though numerous characteristics and advantages of the various embodiments of the present invention have been set forth in the foregoing description, together with details of the structure and functioning of various embodiments of the invention, this disclosure is illustrative only, and changes may be made in detail so long as the functioning of the invention is not adversely affected. For example the particular elements of the casing, tires and pieces of tires, adhesive, waste materials, reinforcing rods and pins and the melted plastic may vary dependent on the particular application for which it is used without variation in the spirit and scope of the present invention. In addition, although the preferred embodiments described herein are directed to a method of recycling and the resulting product it will be appreciated by those skilled in the art that variations and modifications can be made within the scope of the appended claims.

The invention claimed is:

1. A method of recycling tires comprising the steps of:
    placing at least one of tires and/or pieces of tires within a casing or mold;
    applying binders to the at least one of tires and/or pieces of tires so that the at least one of tires and pieces of tires are bound together wherein the binders are an adhesive or adhesives in combination with metal pins, screws, nails, nuts and bolts, wire and steel and/or nylon bands;
    applying a reinforcing means through the at least one of tires and/or pieces of tires;
    melting and pouring an encapsulating means over the top of the at least one of tires and pieces of tires, binders and the reinforcing means to encapsulate the at least one of tires and pieces of tires, binders and the reinforcing means them inside the casing or mold and the encapsulating means and wherein the encapsulating means is plastic and wherein the encapsulating means is heated to a temperature high enough to soften and melt the encapsulating means such that the encapsulating means becomes moldable so that the encapsulating means it is spread to cover and encapsulate the at least one of tires and pieces of tires, binders and the reinforcing means; and
    causing or allowing the encapsulating means to set such that a recycled product is formed.

2. The method according to claim 1, wherein waste materials are placed within the casing or mold before an adhesive is added and the adhesive applied binds the at least one of tires and pieces of tires and waste materials together.

3. The method according to claim 1, wherein waste materials are placed within the casing or mold before the adhesive is added and when the adhesive applied binds the at least one of tires and pieces of tires and waste materials together and wherein the waste material comprises at least one of:
    plastic;
    electronic components and circuit boards;
    batteries;
    pieces of metal and machine components;
    glass and light bulbs;
    asbestos, fibrous cement, concrete; and
    fabrics.

4. The method according to claim 1, wherein the tires or pieces of tires are arranged in a generally concentric arrangement.

5. The method according to claim 1, wherein the reinforcing means is at least one of: metal rods, metal pins, and metal wire.

6. The method according to claim 1, wherein the reinforcing means are in addition to going through the tires arranged in a grid like a pattern and are configured such that they are placed on top of or surround the at least one of tires and/or pieces of tires.

7. The method according to claim 1, wherein the casing:
    has a base and four side walls connected to the base;
    has a leach proof lining;
    is leach proof;
    blocks or resists ultraviolet (UV); or
    is fire resistant.

8. The recycled product created according to the method of claim 1.

9. A building component having:
    a casing;
    at least one of tires and pieces of tires housed within the casing wherein the at least one of tires and pieces of tires are bound together by a binders wherein the binders are an adhesive or adhesives in combination with metal pins, screws, nails, nuts and bolts, wire and steel or nylon bands;

a reinforcing means forced through the tires; and an encapsulating means encapsulates the at least one of tires and pieces of tires and the binders and the reinforcing means within the casing and wherein the encapsulating means is plastic and had been heated to a temperature high enough to soften and melt the encapsulating means such that the encapsulating means it was moldable and spread to cover and encapsulate the tires, binders and the reinforcing means.

10. The building component according to claim 9, wherein the component also has waste materials housed within the casing are bound together and bound to the at least one of tires or pieces of tires.

11. The building component according to claim 9, wherein the component also has waste materials housed within the casing are bound together and bound to the at least one of tires and pieces of tires and wherein the waste material comprises:
   plastic;
   electronic components and circuit boards;
   batteries;
   pieces of metal and machine components;
   glass and light bulbs;
   asbestos, fibrous cement and/or concrete; or
   fabrics.

12. The A building component according to claim 9, wherein the at least one of tires and pieces of tires are arranged in a generally concentric arrangement.

13. The building component according to claim 9, wherein the reinforcing means are metal pins or metal rods.

14. The building component according to claim 9, wherein the reinforcing means in addition to being forced through the at least one of tires and pieces of tires are arranged in a grid pattern and are configured such that the reinforcing means are on top of or surround the at least one of tires and pieces of tires.

15. The building component according to claim 9, wherein the casing:
   comprises a base and four side walls connected to the base;
   has a leach proof lining;
   is leach proof;
   blocks or resists UV; or
   is fire resistant.

\* \* \* \* \*